(12) United States Patent
Ernst

(10) Patent No.: US 6,637,146 B2
(45) Date of Patent: Oct. 28, 2003

(54) FISHING ROD HOLDER

(75) Inventor: Matthew J. Ernst, North Oaks, MN (US)

(73) Assignee: Carter Day International, Inc., Minneapolis, MN (US)

( * ) Notice: Subject to any disclaimer, the term of this patent is extended or adjusted under 35 U.S.C. 154(b) by 0 days.

(21) Appl. No.: 10/087,077

(22) Filed: Feb. 28, 2002

(65) Prior Publication Data

US 2002/0116860 A1 Aug. 29, 2002

Related U.S. Application Data

(60) Provisional application No. 60/272,238, filed on Feb. 28, 2002.

(51) Int. Cl.[7] ............................................. A01K 97/10
(52) U.S. Cl. ........................ 43/21.2; 248/514; 248/538
(58) Field of Search .......................... 43/21.2; 248/514, 248/538, 291.1, 292.13

(56) References Cited

U.S. PATENT DOCUMENTS

| | | | | |
|---|---|---|---|---|
| 1,025,657 A | * | 5/1912 | Towne | 248/291.1 |
| 2,459,549 A | * | 1/1949 | Smith | 43/25 |
| 2,692,106 A | * | 10/1954 | Herrmann | 248/291.1 |
| 2,711,300 A | * | 6/1955 | Nelson | 248/291.1 |
| 3,246,865 A | * | 4/1966 | Latimer | 248/538 |
| 3,835,568 A | * | 9/1974 | Whitfield | 43/17 |
| 4,366,640 A | * | 1/1983 | Clapp | 43/21.2 |
| 4,827,654 A | * | 5/1989 | Roberts | 43/21.2 |
| 4,901,970 A | * | 2/1990 | Moss | 248/514 |
| 4,948,083 A | * | 8/1990 | McNaney | 248/514 |
| 5,295,321 A | * | 3/1994 | Matura | 43/21.2 |
| 5,735,499 A | * | 4/1998 | Phillips | 248/291.1 |
| 6,112,449 A | * | 9/2000 | Blackwell | 43/21.2 |
| 6,213,441 B1 | * | 4/2001 | Baynard | 248/538 |

* cited by examiner

Primary Examiner—Kurt Rowan
(74) Attorney, Agent, or Firm—Jeffrey R. Stone; Briggs and Morgan, P.A.

(57) ABSTRACT

A fishing rod holder that allows horizontal striking of fish either while trolling or still-fishing. The fishing rod holder consists of a rod holder support arm assembly, a rotating unit, a base unit and an optional mounting adapter. The rod holder may be mounted for horizontal striking on the top surface of a gunnel wall on a boat or other substantially flat horizontal surface. Alternatively, the mounting adapter may be used to mount the rod holder to a boat handle rail. The rod holder support arms are slidably engaged in the support arm assembly and allow for customized vertical orientation of the rod's tip with respect to the reel. In addition, the horizontal orientation of the rod may be customized to accommodate fishing technique and fishing conditions.

8 Claims, 5 Drawing Sheets

FISHING ROD HOLDER

The applicant hereby claims the benefit of provisional patent application No. 60/272,238, filed Feb. 28, 2002.

FIELD OF THE INVENTION

This invention relates generally to fishing pole holders that may be used to strike a fish while trolling in a boat or while still-fishing.

BACKGROUND OF THE PRESENT INVENTION

Fishing rod holders are historically used to aid anglers and facilitate their ability to fish while performing other tasks. Current fishing rod holders require the operator to either remove the rod to strike the fish or strike the fish in a vertical manner while the rod is in the holder. Because both of these methods are inefficient and ineffective, there is a need for a fishing rod holder that allows the operator to strike the fish using the more natural and more effective horizontal motion while the fishing rod is in the holder. The rod should also be easily removable from the holder to facilitate reeling in the fish.

SUMMARY OF THE INVENTION

A fishing rod holder that allows horizontal striking of fish either while trolling or still-fishing. The fishing rod holder consists of a rod holder support arm assembly, a rotating unit, a base unit and an optional mounting adapter. The rod holder may be mounted for horizontal striking on the top surface of a gunnel wall on a boat or any other substantially flat horizontal surface. Alternatively, the mounting adapter may be used to mount the rod holder to a boat handle rail. The rod holder support arms are slidably engaged in the support arm assembly and allow for selectable vertical orientation of the rod's tip with respect to the reel. In addition, the horizontal orientation of the rod may be selectable to accommodate fishing technique and fishing conditions.

A principal object and advantage of the present invention is to allow horizontal striking of fish and ease of removal of the rod from the rod holder following a strike while either trolling or still-fishing.

Another principal object and advantage of the present invention is to allow the rod to be selectably-oriented in the vertical plane as well as the horizontal plane, depending on the fishing technique selected and the conditions.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 2:
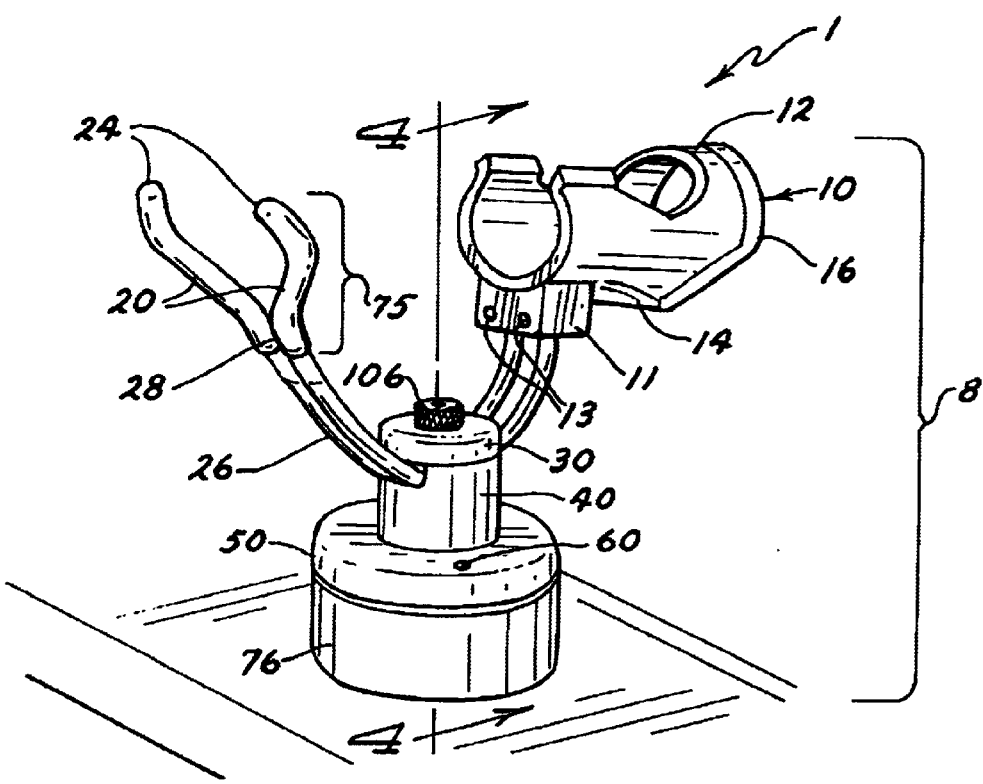
FIG. 2 is a perspective view of the apparatus attached to a horizontal surface such as a boat gunnel wall.

Referring to FIG. 2, the fishing rod holder comprises a rod holder support arm assembly 8, a rotating unit 50, a base unit 76, and a mounting adaptor 111.

Figure 4:
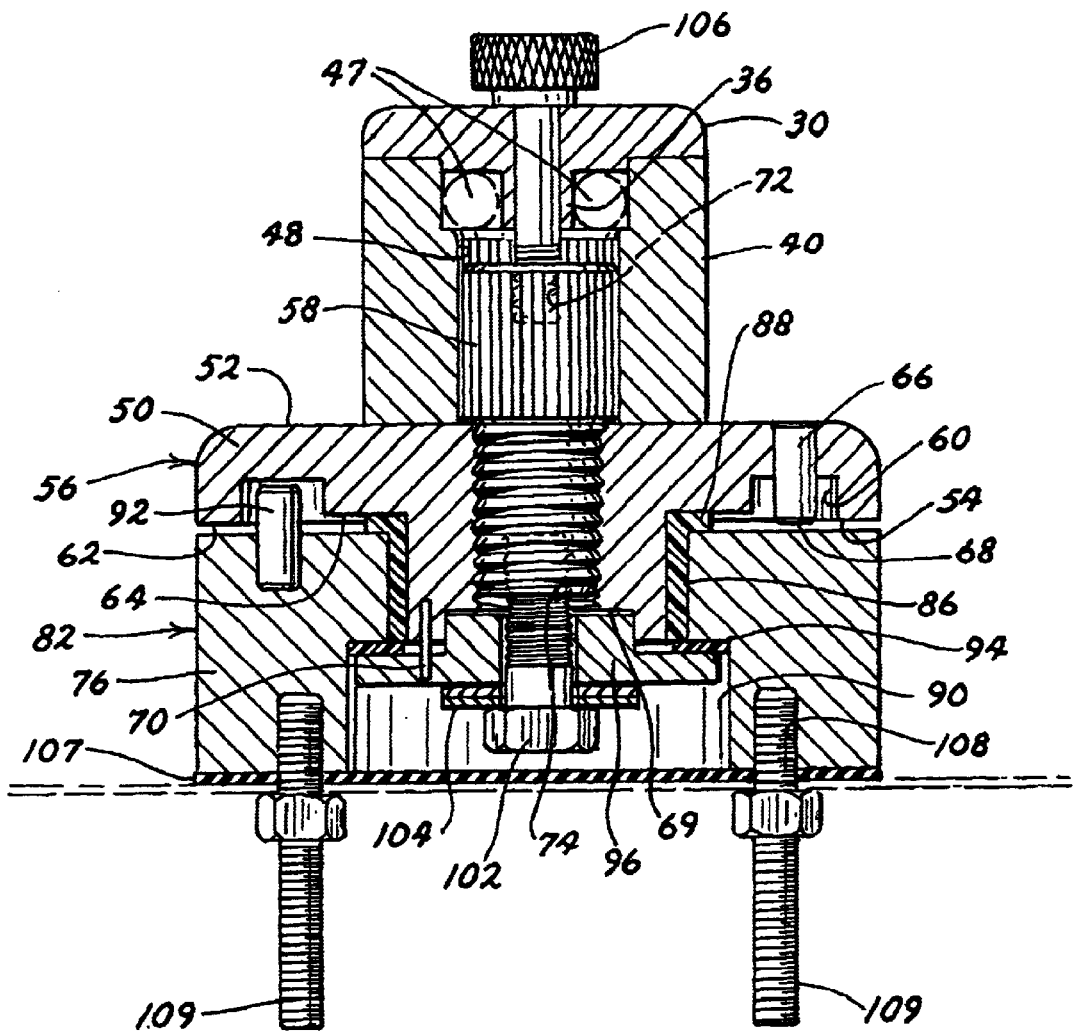
FIG. 4 is a cross-sectional view of the apparatus.

Referring to FIG. 4, the rotating unit 50 has a substantially cylindrical profile and further comprises a mounting post 58 fixedly attached to substantially the center of the top surface 52 of the rotating unit 50. The mounting post 58 has a threaded central bore 72 and a splined profile section 58. A rotational stop pin channel 60 is circumferentially disposed on the bottom surface 54 of the rotating unit 50 forming an outer lip 62 and an inner lip 64. A rotational stop pin 66 is fixedly mounted in the rotational stop pin channel 60. The lower portion of rotating unit 50 comprises a substantially smooth lower cylinder 68. An anti-rotate pin 70 is fixedly attached to the bottom surface 69 of the lower cylinder 68. The lower cylinder 68 has a threaded central bore 74.

Figure 3:
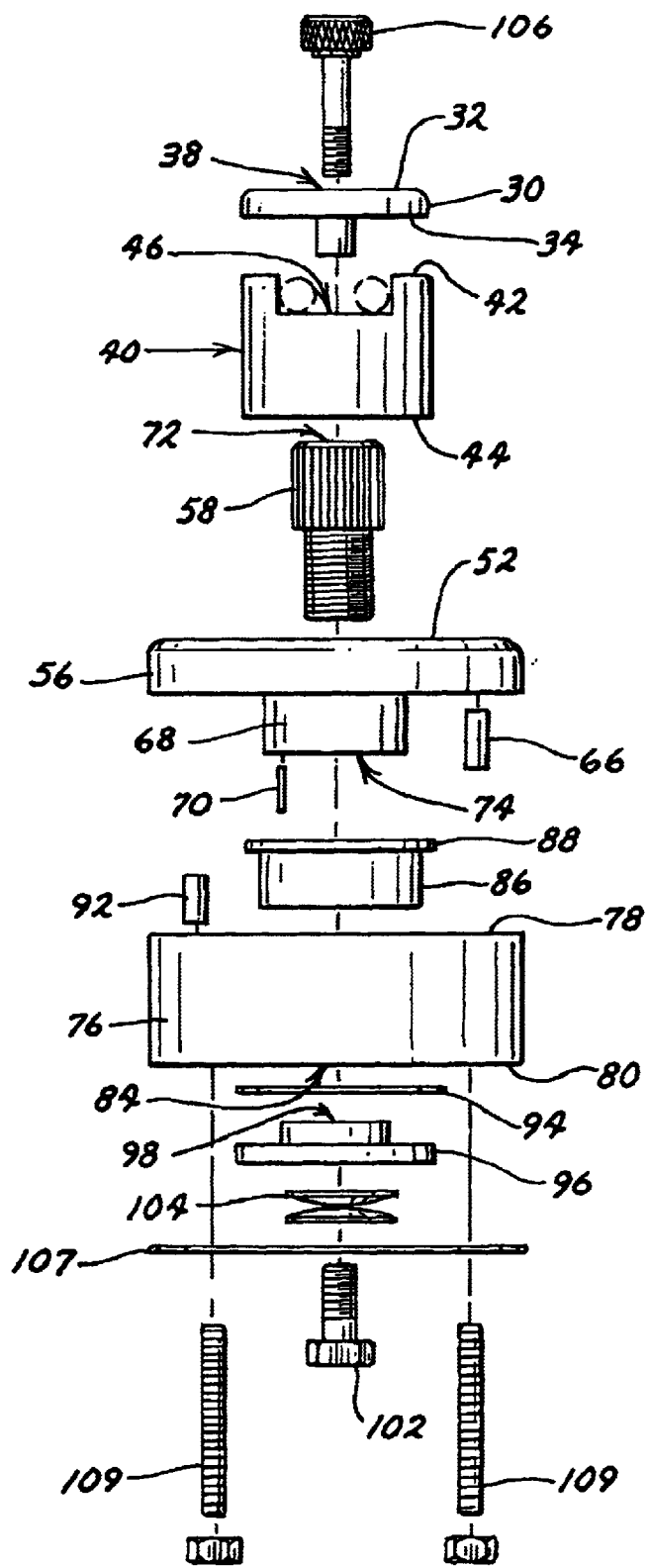
FIG. 3 is an exploded view of the apparatus.

Referring now to FIGS. 3 and 4, the base unit 76 comprises a central bore 84 extending therethrough. The diameter of the central bore 84 widens approximately halfway though base unit 76, forming a central bore lip 90 when viewed from the bottom. The central bore 84 is partially lined with a flange bearing 86 that extends, and includes a flange lip 88, above the top surface 78 of the base unit 76. The flange bearing 86 may be composed of Teflon or any similar material that allows for minimal rotational friction. When lined with the flange bearing 86, the central bore 84 rotatably engages the lower cylinder 68 on the bottom surface 54 of the rotating unit 50. The base unit 76 further comprises a rotational stop pin 92 extending from the top surface 78. The stop pin 92 is circumferentially positioned to move within rotational stop pin channel 60, allowing for rotational contact between stop pin 66 and rotational stop pin 92 during operation.

A thrust bearing 94 is disposed on the central bore lip 90 and may be composed of Teflon or other friction-minimizing material. The thrust bearing 94 is held in place by a bearing retainer 96. The bearing retainer 96 has a substantially smooth central bore 98 through which a retaining bolt 102 is disposed and an aperture 100 that receives the anti-rotate pin 70, stopping the complete rotation of the rotating unit 50 and preventing the retaining bolt 102 from backing out during operation. The retaining bolt 102 threadably engages the threaded central bore 74 in the rotating unit's lower cylinder 68 thereby biasing the bearing retainer 96 against the thrust bearing 94 and connecting the base unit 76 to the rotating unit 50. Compression washers 104 or other similar biasing means are used in conjunction with the retaining bolt 102 to provide the spring resistance necessary to offer minimal friction on the flange bearing 86 during rotation of the rotating unit 50. The bottom surface 80 of the base unit 76 has a plurality of threaded holes 108 to be used for mounting to a flat surface, using mounting screws 109 or similar means, or for attaching the mounting adaptor 111.

Figure 5:
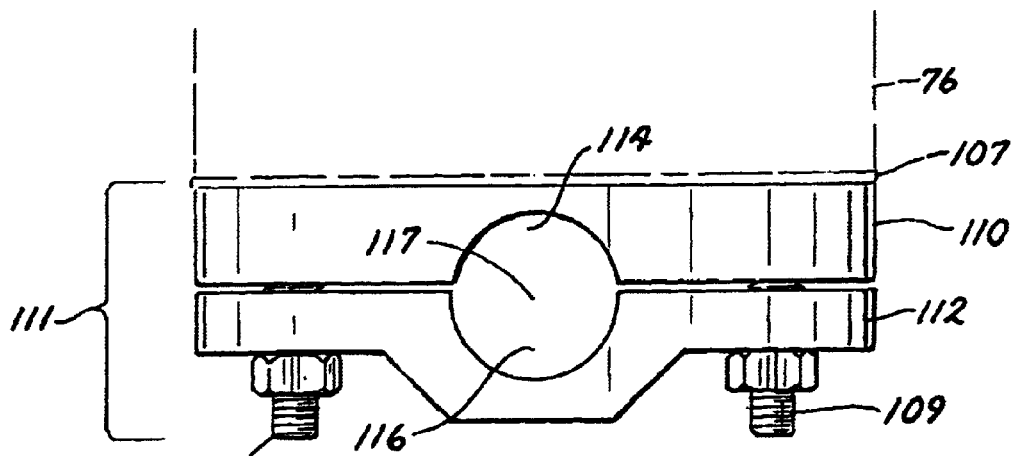
FIG. 5 is a side elevation view of the mounting adaptor.

Referring now to FIG. 5, the mounting adaptor 111 is comprised of a top member 110 and a bottom member 112. The top and bottom members 110 and 112 together form a substantially cylindrical cavity 117 capable of securely fastening the fishing rod holder to boat handle rails or other similar structures. It is understood that in practice the cavity profile can take on virtually any shape as long as it is capable of fastening to boat handle rails or other similar structures.

The top 110 and bottom 112 members are secured to the appropriate structure using mounting screws 109 or similar fastening means.

Figure 6:
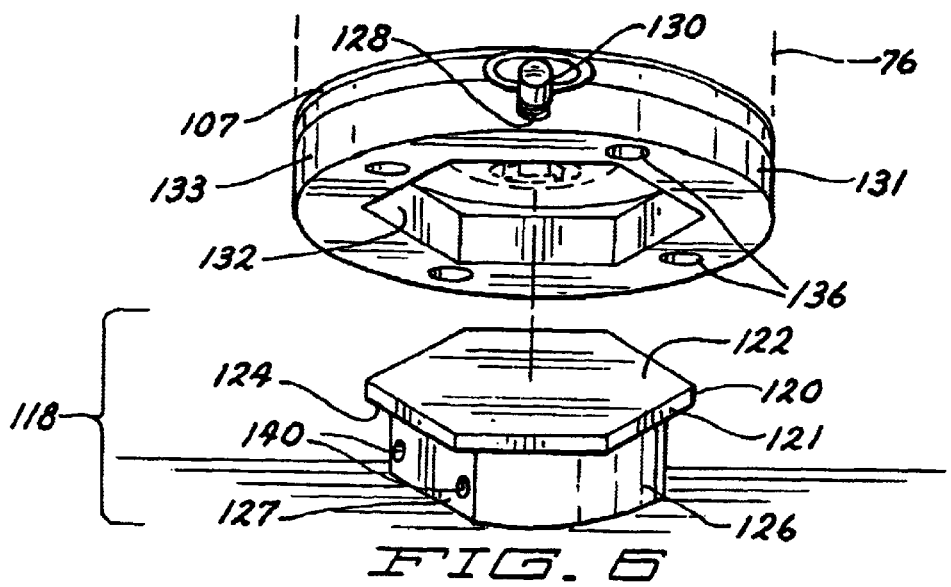
FIGS. 6–8 are perspective, top elevation, and side elevation views, respectively, of the quick-mount feature of the apparatus.
Figure 7:
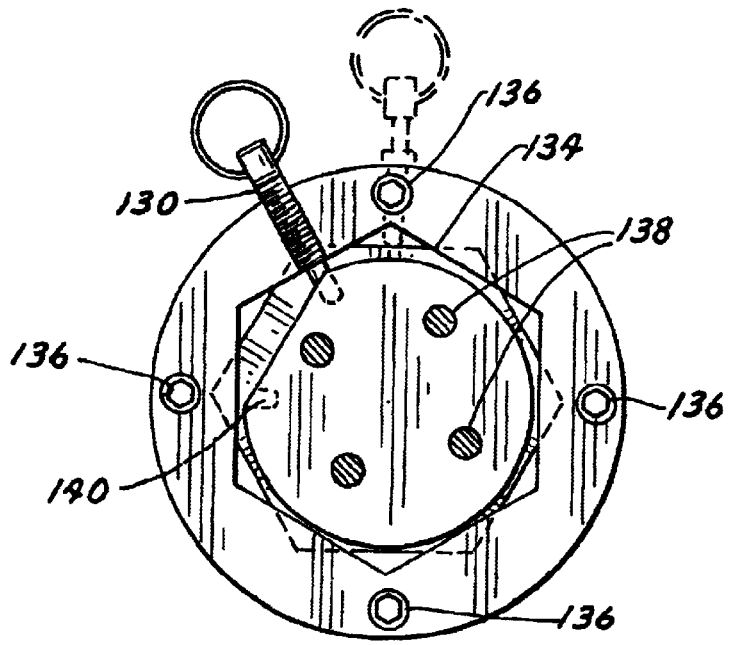
Figure 8:
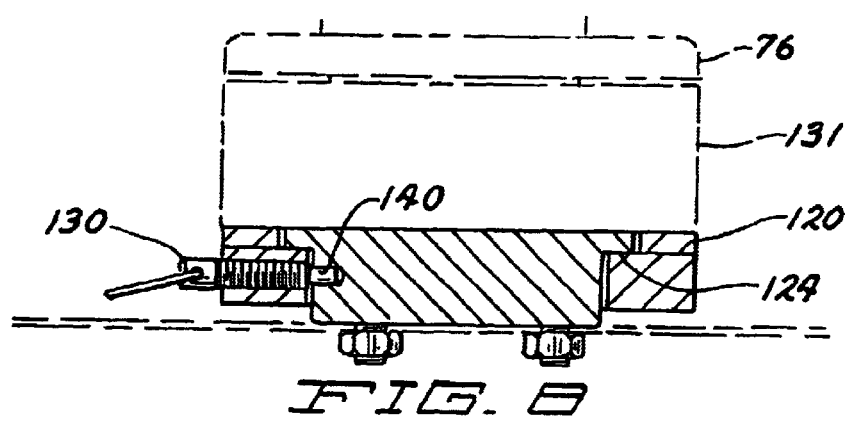

An alternate embodiment of the apparatus allowing for quick mounting and directional biasing of the fishing rod holder is provided for in FIGS. 6–8. This embodiment requires a mounting block 118 with a top section 120 having a polygonal profile 134 with a diameter greater than that of the bottom section 126. The side surface 127 of the bottom section 126 of the mounting block 118 further has a plurality of apertures 140.

This embodiment includes a quick-mount adaptor 131 that is fixedly attached to the bottom surface 80 of the base unit 76. The adaptor has a polygonal profile cavity 132 that matches the profile of the top section 120 of the mounting block 118 and which nonrotatably slidably engages the top section 120 of the mounting block 118. When fully engaged, the top surface 122 of the mounting block 118 is substantially disposed against the bottom surface 80 of the base unit 76 and the sides 132 of the polygonal profile of the quick mount adaptor 131 are nonrotatably engaged with the side surfaces 121 of the top section 120 of the mounting unit 118. A plurality of threaded holes 136 are disposed in the quick-mount adaptor 131 for fastening the adaptor 131 to the bottom of the base unit 76. A mounting gasket 107 is further disposed between the adaptor 131 and the bottom of the base unit 76. In addition, at least one aperture 128 is provided on the side surface 133 of the quick-mount adaptor 131. This aperture 128 is used to secure the fishing rod holder when the apparatus is engaged with the mounting unit 118 by insertion of a fastening device such as a key or pin 130 as shown in FIGS. 7–8. The pin 130 engages the aperture 128 on the quick-mount adaptor 131 and the aperture 140 disposed on the side surface 127 of the bottom section 126 of the mounting unit 118.

Figure 1:
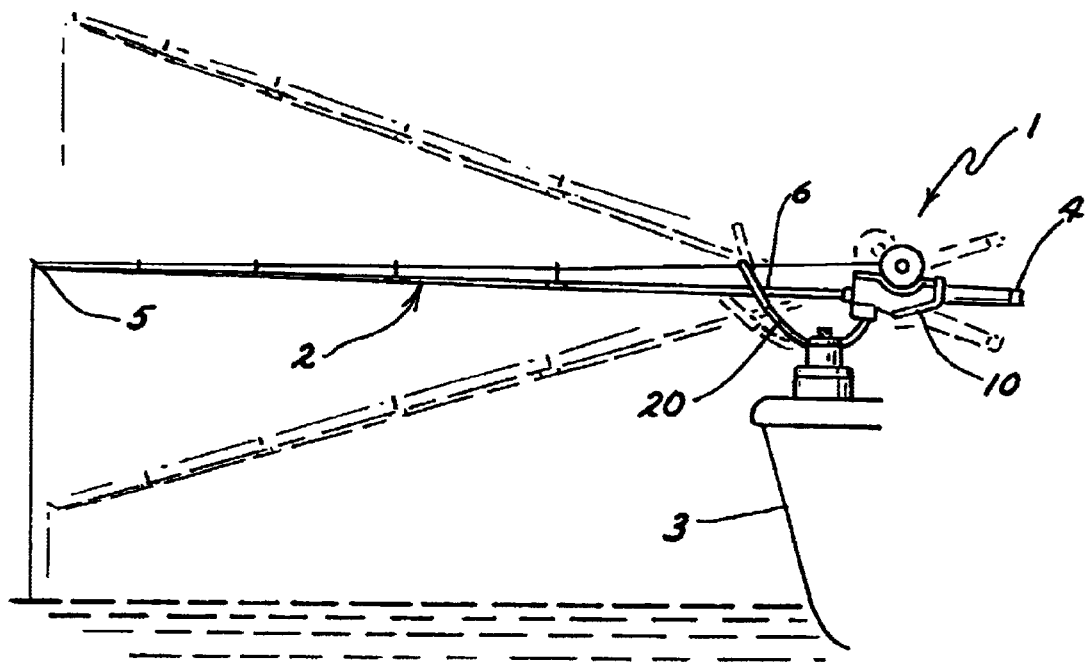
FIG. 1 is a side view of the apparatus in operation while attached to a boat gunnel wall.

Referring to FIGS. 1 and 2, the rod holder support arm assembly 8 further comprises a sleeve holder 10 and support arms 20, a rod cap holder 30 and an support arms base 40. The sleeve holder 10 is fixedly attached to an adaptor 11. The adaptor 11 is fixedly attached to the proximal end 22 of the support arms 20. The method for attaching the sleeve holder 10 to the adaptor 11 and the adaptor 11 to the support arms 20 are well known in the art and include rivets, screws and other similar means. The support arms 20 are parallel to one another, are substantially smooth, and the central sections 26 thereof are bent upward resulting in a substantially curvelinear profile. The support arms 20 are fixedly attached to each other near the distal end 24 of the arms to prevent motion of the arms relative to one another, forming a joint 28. The arms 20 may be joined by various means known in the art including, for example, welding or threaded screws. The distal end 24 of the arms 20 are shaped to allow ease of insertion of the fishing rod 2 into the support arms 20. In addition, the distal ends 24 of the arms 20 are coated 25 to prevent corrosion and wear of the metal surface resulting from water and continuous contact with the fishing rod 2.

Referring to FIGS. 3 and 4, the support arms base 40 has a substantially cylindrical profile and a central bore with a splined profile 48. It is understood that the cylindrical form is aesthetic and not functional. As a result, a wide variety of profiles may be selected. A transverse groove 46 is disposed across the top surface 42 of the support arms base 40. The width of the transverse groove 46 is substantially equivalent to the diameter of the splined central bore 48.

A transverse lip 36 is disposed along the bottom surface 34 of the rod holder cap 30. When the rod cap holder 30 engages the support arms base 40, the transverse lip 36 engages the support arms base 40, forming two transverse channels 47 that slidably capture the support arms 20 between the rod cap holder 30 and the support arms base 40. The rod cap holder 30 has a substantially smooth central bore 38 through which a thumb screw 106 or other fastening device is disposed. When the mounting post 58 on the rotating unit 50 is engaged with the splined shaft 48 of the support arms base unit 40, the arms support assembly 8 is secured to the rotating unit 50 by threadably engaging the thumb screw 106 that extends from the rod cap holder 30 to the threaded central bore 72 of the mounting post 58. This screw 106 may be loosened to allow adjustment of the vertical orientation of the fishing rod 2 by sliding the support arms 20 forward or backward in the transverse channels 47 of the support arms assembly 8. The thumb screw 106 is then tightened to retain the support arms 20 in the desired orientation.

OPERATION OF THE PRESENT INVENTION

With the foregoing description of the present invention, its operation can now be fully explained.

The rotating unit's 50 lower cylinder 68 of rotating unit 50 is inserted into the central bore 84 of the base unit 76. The lower cylinder 68 is rotatably disposed against the flange bearing 86 lining the central bore 84 of the base unit 76. The inner lip 64 on the bottom surface 54 of the rotating unit 50 is rotatably disposed against the flange bearing lip 88 that extends above the top surface 78 of the base unit 76. The retaining bolt 102 is disposed through the bearing retainer 96 and the thrust bearing 94 disposed on lip 90 in the central bore 84 of the base unit 76 and threadably engages the threaded central bore 74 disposed in the lower cylinder 68 of the rotating unit 50. The rotational tension is adjusted by tightening or loosening the retaining bolt 102. Compression washers 104, or the equivalent, are used in conjunction with the retaining bolt to provide sufficient spring resistance to minimize friction on the flange bearing during rotation of the cover. The bearing retainer 96 is nonrotatably engaged with the anti-rotate pin 70, thus ensuring that the rotating unit's rotation does not cause the retaining bolt 102 to become loosened, tightened, or disengaged.

Referring now to FIGS. 1 and 2, the butt end 4 of the fishing rod 2 is received by the sleeve holder 10 and the rod 2 is allowed to rest against the conjunction 28 of the support arms 20. The vertical orientation of the tip 5 of the rod 2 with respect to the butt end 4 can be adjusted by loosening the thumb screw 106 and sliding the support arms 20 forwardly within the transverse channels 47 of the support arms assembly 8 or rearwardly to decrease the height of the rod tip 5. The fishing rod 2 can be oriented in a substantially vertical position by sliding the support arms 20 completely forward, bringing the adaptor 11 into contact with the support arms assembly 8. Conversely, the rod tip 5 may be oriented below the butt end 4 of the rod 2 in a less than horizontal position by sliding the support arms 20 back until the conjunction 28 between the support arms 20 is contacted by the support arms assembly 8. Thus, the rod tip 5 may be oriented vertically in any position between these two extremes relative to the butt end 4 of the rod 2. Once the desired rod orientation has been established, the thumb screw 106 is then retightened, fixedly retaining the support arms 20 in the support arms assembly 8. In this manner, the support arms 20 are captured in the transverse channels 47 created by the rod cap holder 30 and the support arms base 40. The thumb screw 106 is threadably engaged with the threaded central bore 72 of the rotating unit's splined mounting post 58.

With the vertical orientation of the fishing rod holder established, the fishing rod holder's horizontal orientation may now be described. There are three elements that provide customization of horizontal orientation. First, as indicated by FIGS. 6–8, the mounting block 118 and the interior side surfaces 132 of the quick-mount adaptor 131 have slidably engageable and complementary profiles. This allows quick-mount adaptor 131 to be disengaged by removing the pin 130, rotating the adaptor 131 such that the rod 2 is directed over the fishing area and the adaptor 131 reengaged with the mounting block 118 and resecured with the pin 130. Second, the engagement of the splined profile located in the central bore 48 of the support arms base 40 with the mounting post 58 of the rotating unit 50 allows the operator to orient the fishing rod holder using a full 360 degrees of horizontal motion. The transverse channels 47 created by the rod cap holder 30 and the support arms base 40 allows for two directional positions, 180 degrees from each other, for the fishing rod 2 at any given splined engagement. The third component available to establish proper horizontal orientation of the fishing rod 2 involves the rotational stop pin 92 on the base unit 76. The rod holder apparatus may be rotated approximately 355 degrees in either direction from the rotational stop pin 92 on the base unit 76. This pin 92 determines where the fishing rod holder's rotation will be stopped as it contacts the rotational stop pin 66 on the rotating unit 50.

Figure 9:
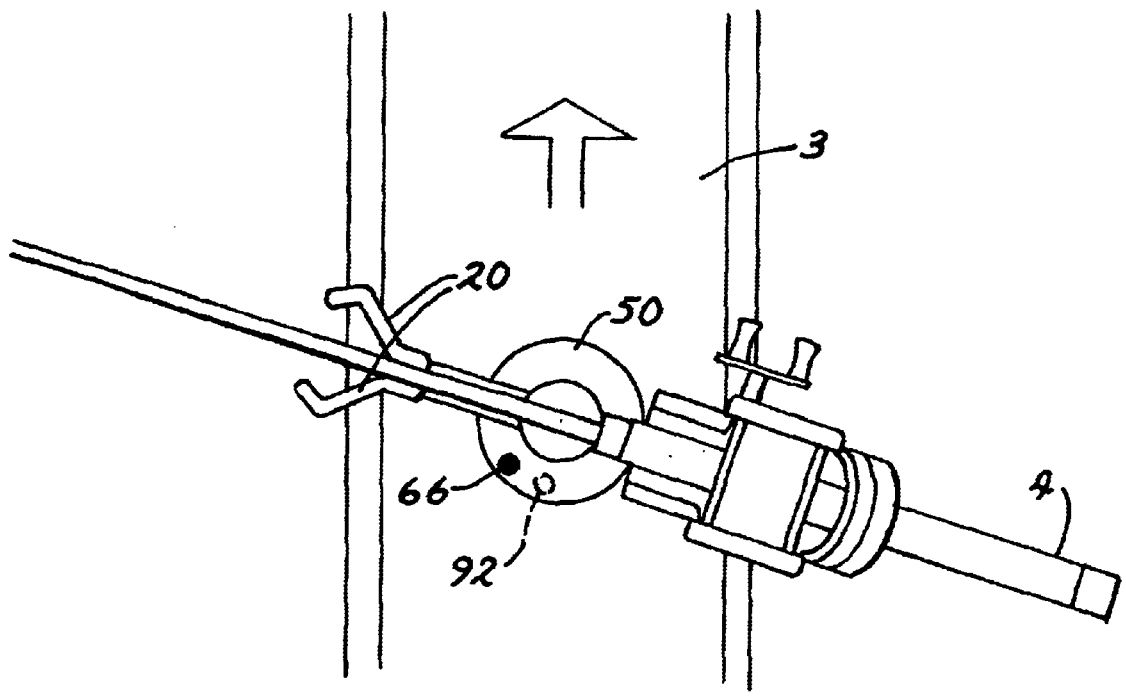
FIGS. 9 and 10 are top views showing the apparatus installed on a boat gunnel wall while the boat is trolling.
Figure 10:
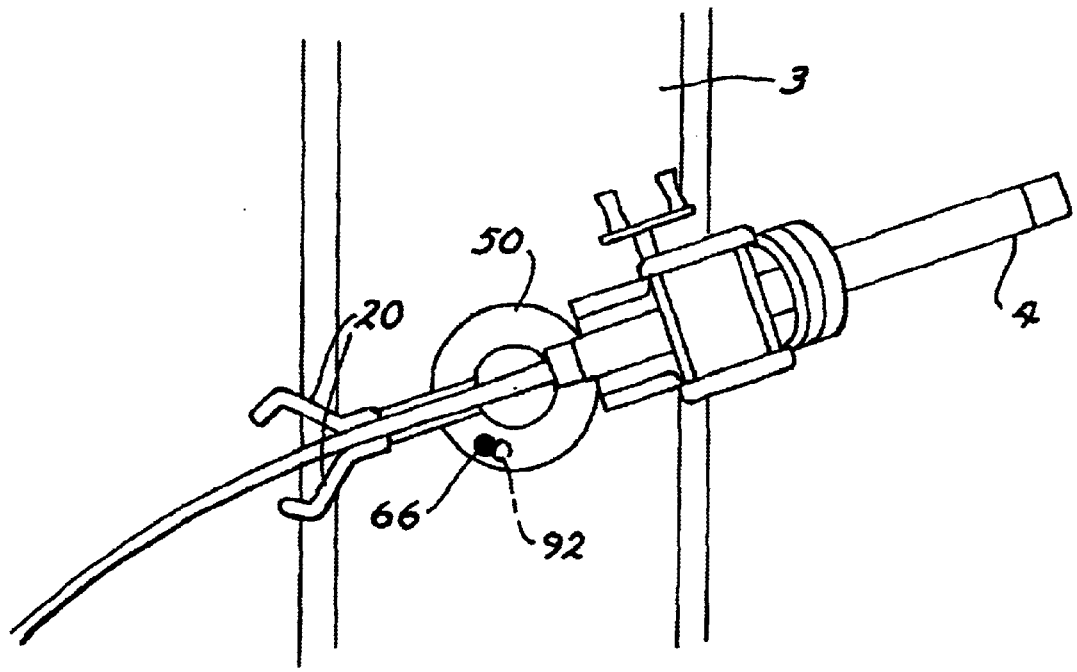

If trolling, the apparatus is preferably mounted with the base unit's rotational stop pin 92 oriented substantially as shown in FIGS. 9 and 10. The arrow in FIG. 9 indicates the direction of travel of the boat 3. The transverse channel 47 in the support arms assembly 8 is oriented to allow the rod 2 to be held out over the water. The rod 2 is free to rotate in the direction opposite that of the moving boat 3 until the rotating unit's rotational stop pin 66 and the base unit's rotational stop pin 92 come into contact, preventing further horizontal rotation.

Generally, when a fish is detected, the operator may strike the fish in a horizontal manner by rotating the apparatus as described herein. The fishing rod may then be quickly, easily and smoothly removed from the apparatus at any time to facilitate reeling the fish in.

The above specification describes certain preferred embodiments of this invention. This specification is in no way intended to limit the scope of the claims. Other modifications, alterations, or substitutions may now suggest themselves to those skilled in the art, all of which are within the spirit and scope of the present invention. It is therefore intended that the present invention be limited only by the scope of the attached claims below:

What is claimed is:

1. A fishing rod holder apparatus comprising:
   A support arm assembly, including
      a sleeve holder for receiving the butt end of a fishing rod, said sleeve holder including:
         a top surface;
         a bottom surface;
         a proximal end; and
         a distal end;
      at least two support arms including:
         a proximal end;
         a distal end; and
         a central section therebetween;
         said support arms being fixedly attached to said bottom surface of said distal end of said sleeve holder, said support arms being substantially separated from each other and parallel to each other with and having a substantially curvilinear profile, said support arms being connected to each other in at least one place in said central section, said support arms being bent outward and upward at said distal end so as to receivably support and retain the central section of a fishing rod;
   A rod cap holder with a top surface and a bottom surface;
      Said bottom surface of said rod cap holder having a transverse lip; and
      Said rod cap holder having a central bore;
   A arm support base unit including:
      A top surface; and
      A bottom surface;
      Said top surface of said arm support base unit having a transverse groove disposed therein;
      Said arm support base unit further having a central bore with a splined profile;
   A rotating unit including:
      A top surface; and
      A bottom surface;
      A circumferential edge;
      A splined mounting shaft disposed substantially near the center of said top surface of said rotating unit;
      Said bottom surface having a rotational stop pin channel disposed circumferentially thereon forming an inner lip and an outer lip;
      A rotational stop pin is fixedly attached in substantially the center of said rotational stop pin channel, said rotational stop pin is visible on said top surface of rotating unit, but not extending substantially above said top surface;
      Said rotational stop pin is disposed a fixed distance from the circumferential edge of said rotating unit;
      A smooth shaft having a bottom surface is disposed substantially near the center of said bottom surface of said rotating unit;
      An anti-rotate pin is fixedly attached to said bottom surface of said smooth shaft; and
      A threaded central bore is disposed within said splined mounting shaft and said smooth shaft;
   A base unit including:
      A top surface;
      A bottom surface;
      And a circumferential edge;
      A central bore; and
      A flange bearing that partially covers said central bore and extends above said top surface forming a flange bearing lip, said central bore rotatably receives said smooth shaft on said rotating unit;
      Said central bore widens forming a lip, said flange bearing covers the narrow portion of said central bore;
      Said top surface further includes a rotational stop pin that is disposed at substantially the same distance from said circumferential edge of said base unit as said rotational stop pin disposed on said bottom of said rotating unit is disposed from said circumferential edge;
      A thrust bearing is disposed on said lip within said central bore;
      Said thrust bearing is held in position by a bearing retainer, said bearing retainer having a substantially smooth central bore and an aperture to receive said anti-rotate pin;
      A retaining bolt is disposed through compression washers and through said central bore of said bearing retainer; said retaining bolt threadably engages said threaded central bore of said smooth shaft of said rotating unit;

Said splined central bore of said arms support base is engaged with said splined mounting shaft of said rotating unit;

Said support arms are placed in said transverse groove of said arms support base and said rod cap holder engages said arms support base, said transverse lip of said rod cap holder is disposed between said support arms;

A thumb screw is disposed through said central bore of said rod cap holder and threadably engages said threaded central bore of said splined mounting shaft;

a means for adjusting the horizontal directional orientation of the rod;

a means for mounting said apparatus to a substantially flat surface or to substantially cylindrical objects, wherein said rotating assembly is rotatably engaged with said base unit; and A means for mounting said base unit to a substantially flat surface or to substantially cylindrical objects.

2. The apparatus of claim 1 wherein said means for adjusting the vertical orientation of the fishing rod's tip with respect to the reel further includes sliding said substantially curvilinear support arms in said transverse channels forwardly or rearwardly, causing said support arms to raise or lower the rod's tip with respect to the rod's reel, and further including a means for securing said support arms in the desired position.

3. The apparatus of claim 1 wherein said means for adjusting the horizontal directional orientation of the rod further comprises a mounting unit with a polygonal profile and a mounting adaptor, fixedly attached to said base unit, said adaptor having a profile that matches said polygonal profile of said mounting unit, said adaptor further slidably engaging said mounting unit and disposing said fishing rod holder in the desired direction.

4. The apparatus of claim 1 wherein said means for adjusting the horizontal directional orientation of the rod further comprises using said splined mounting shaft and said splined central bore of said arms support base to directionally bias said apparatus.

5. The apparatus of claim 1 wherein said means for adjusting the horizontal directional orientation of the rod further comprises a means for biasing the rod's horizontal rotational motion in a given direction by orienting said rotational stop pin disposed on said rotating unit in desired direction, whereby said rotational unit is free to rotate circumferentially until said rotational stop pin disposed on said rotating unit contacts said rotational stop pin disposed on said base.

6. The apparatus of claim 1 wherein said means for mounting includes a mounting unit having a top section and a bottom section;

said top section having a top surface and a bottom surface, said top section having a diameter that is larger than said bottom section, and said top section having a polygonal profile;

said bottom section having a side surface, said side surface having a plurality of apertures disposed thereon;

said apparatus further including a mounting adaptor having a side surface and a profile complementary to said top section of said mounting unit, said mounting adaptor fixedly attached to said bottom surface of said base unit and slidably and nonrotatably engageable with said top section of said mounting unit;

said adaptor further including at least one aperture disposed on said side surface such that a fastening device may be disposed through said adaptor aperture and further engaging said mounting adaptor aperture.

7. The apparatus of claim 1 wherein said mounting means includes:

a top member having a top surface, a bottom surface and a transverse cavity on said bottom surface;

a bottom member having a top surface, a bottom surface and a transverse cavity on said top surface;

said top surface of said top member is fixedly attached to said bottom surface of said base unit;

said bottom surface of said top member is fixedly attached to top surface of said bottom member, such that said transverse cavities form a substantially cylindrical cavity;

said cylindrical cavity used to mount said apparatus to boat handle rails or other similarly shaped object.

8. A fishing rod holder comprising:

a support arm assembly including a sleeve holder and one or more support arms for holding a fishing rod;

an arm support holder that slidably engages said support arms to allow vertical orientation of the fishing rod;

a rotating unit that rotatably engages said arm support holder, the rotating unit having a bottom surface wherein a circumferential channel is disposed thereon, a rotating unit rotational stop pin being mounted within said circumferential channel; and a base unit configured to be secured to a structure that rotatably engages said rotating unit, said base unit having a top surface and a base unit rotational stop pin extending from said top surface such that said base unit rotational stop pin slidably engages said circumferential channel of said rotating unit when said base unit and said rotating unit are engaged, said rotating unit being capable of free horizontal rotation relative to said base unit until said rotating unit rotational stop pin and said base unit rotational stop pin are in contact and a means for mounting said base unit to a boat or other fixed structures.

* * * * *

UNITED STATES PATENT AND TRADEMARK OFFICE
CERTIFICATE OF CORRECTION

PATENT NO. : 6,637,146 B2  Page 1 of 1
APPLICATION NO. : 10/087077
DATED : October 28, 2003
INVENTOR(S) : Matthew J. Ernst It is certified that error appears in the above-identified patent and that said Letters Patent is hereby corrected as shown below:

Related U.S. Application Data:

(60) Provisional application No. 60/272,238̶0̶, filed on February 28, 2002̶1̶.

Signed and Sealed this

Fifteenth Day of August, 2006

JON W. DUDAS
*Director of the United States Patent and Trademark Office*